Figure 1:
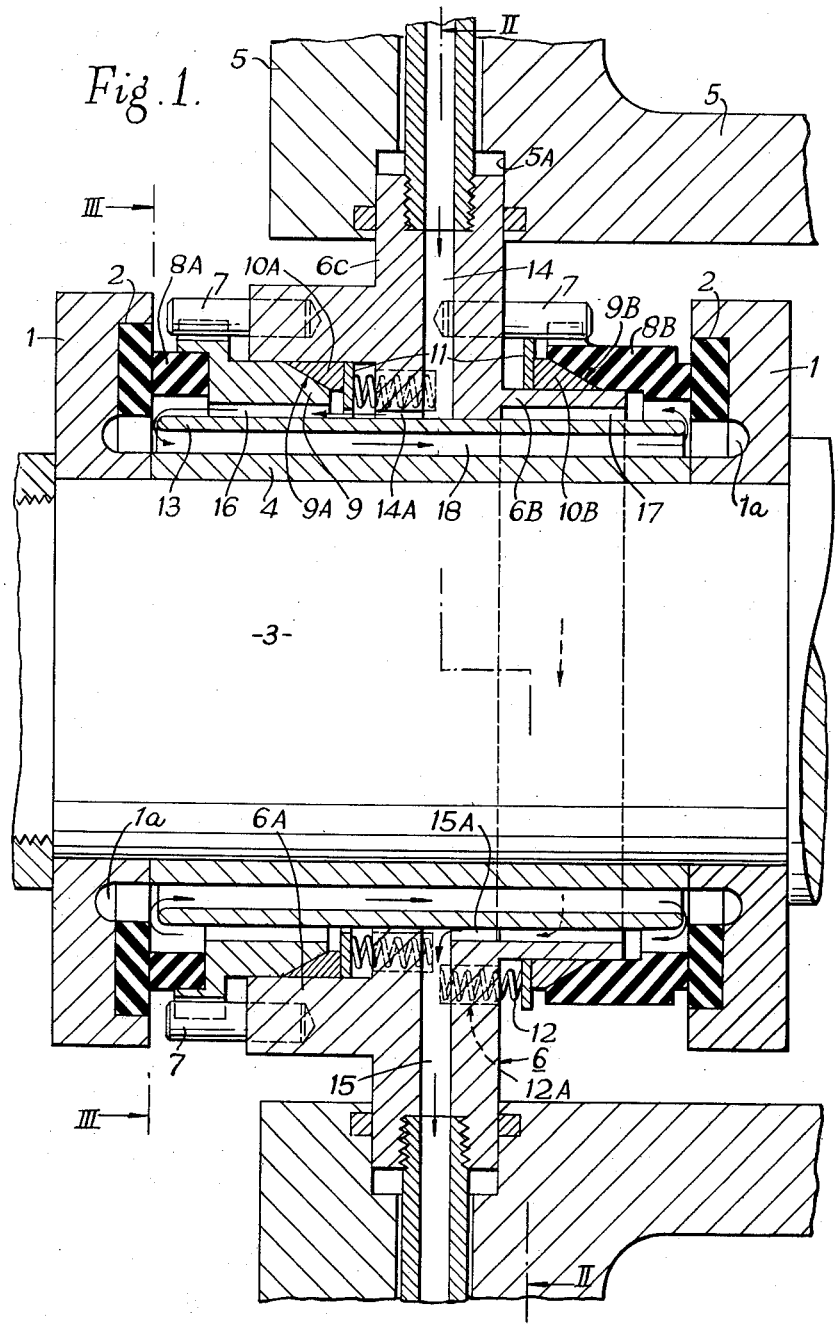

April 24, 1962  S. C. W. WILKINSON  3,031,197
ROTARY SEALING DEVICE
Filed March 30, 1959  5 Sheets-Sheet 5

INVENTOR:
Samuel C W. WILKINSON
BY:
Wenderoth, Lind & Ponack
ATTORNEYS

United States Patent Office 3,031,197
Patented Apr. 24, 1962

3,031,197
ROTARY SEALING DEVICE
Samuel C. W. Wilkinson, Cookham Village, England, assignor to Crane Packing Limited, Slough, Buckinghamshire, England, a British company
Filed Mar. 30, 1959, Ser. No. 802,738
Claims priority, application Great Britain Apr. 3, 1958
10 Claims. (Cl. 277—16)

This invention relates to face-type mechanical seals between relatively rotating members, such as a rotating shaft and a stationary housing and is particularly concerned with the cooling of such seals.

In the use of rotary sealing devices for high speed and/or high temperature service one of the major problems involved is that of adequate cooling of the seal components, it being particularly desirable to ensure the presence between the seal faces of a fluid film of the cooling liquid rather than of the liquid being retained by the seal. In addition it is necessary on high temperature applications for the shaft to be adequately cooled in order to protect the shaft bearings.

The object of the present invention is to provide a seal construction of compact form which meets all these requirements.

With the foregoing object in view the present invention provides a liquid-cooled face-type mechanical seal for use between relatively rotating members, said seal comprising co-acting sealing and seating rings having rubbing faces and being respectively connected to one of said members, said seating ring having a recess in its inner face concentric to, within and adjacent to said rubbing faces, sleeving defining an extended annulus surrounding one of said relatively rotating members, one end of said annulus opening out opposite to said recess, and conduit means for delivering a liquid coolant to said annulus to circulate said coolant therethrough and in the region of said ring rubbing faces.

Where one of the relatively rotating members is a rotating shaft and the other member is a stationary housing surrounding said shaft, the seating ring is mounted around the shaft for rotation therewith and the co-acting sealing ring freely encircles the shaft and is held against rotation by connection with said housing, said sealing and seating rings being biased—usually by spring means— into facial rubbing contact.

If desired paired sealing and seating rings may be spaced along a shaft with sleeving interposed therebetween for flowing a liquid coolant over the shaft and in the regions of the ring rubbing faces. This sleeving may also form or be associated with a bearing for the shaft, which is suitably constructed to allow for passage therethrough of the coolant, which latter also serves as a lubricant for the bearing.

The sleeving may be supported by a carrier, conveniently of disc-shape and having passageways for feeding and exhausting the liquid coolant and for directing the flow thereof to circulate said coolant through and around at least one end of the sleeve and if desired over the sleeve exterior.

A particular advantage of seal constructions according to this invention is that those seal components which are rotating with the shaft are of simple construction and can readily be balanced. All the components (such as springs and flexible sealing members) which could be adversely affected by centrifugal force are stationary.

Figure 2:
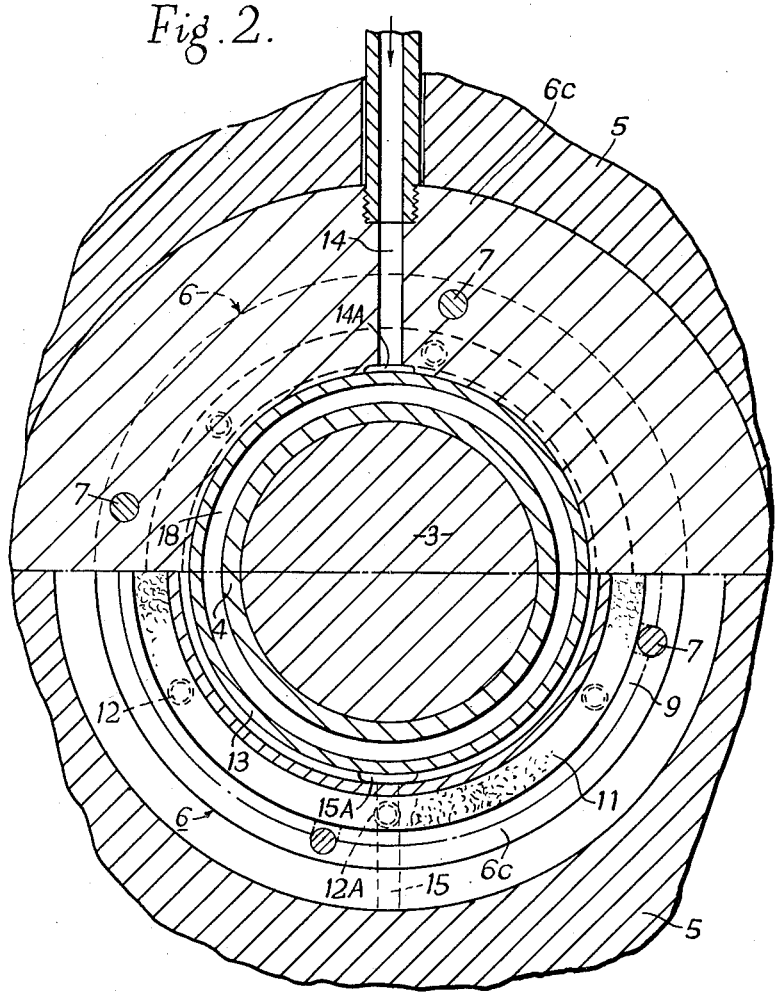
Figure 3:
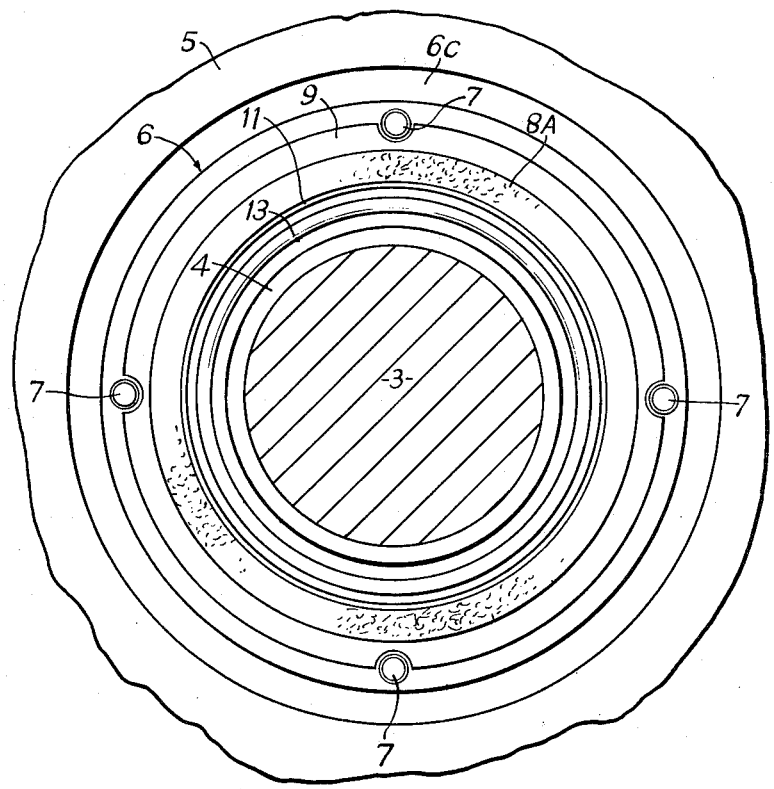
Figure 4:
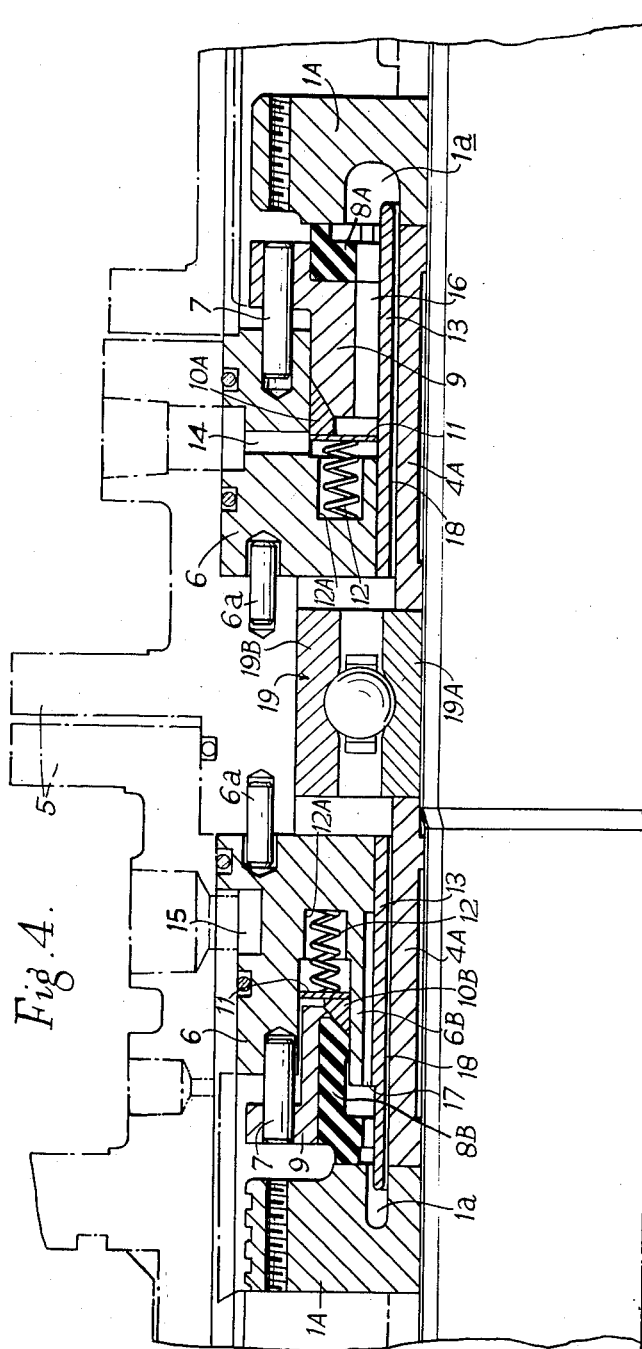
Figure 5:
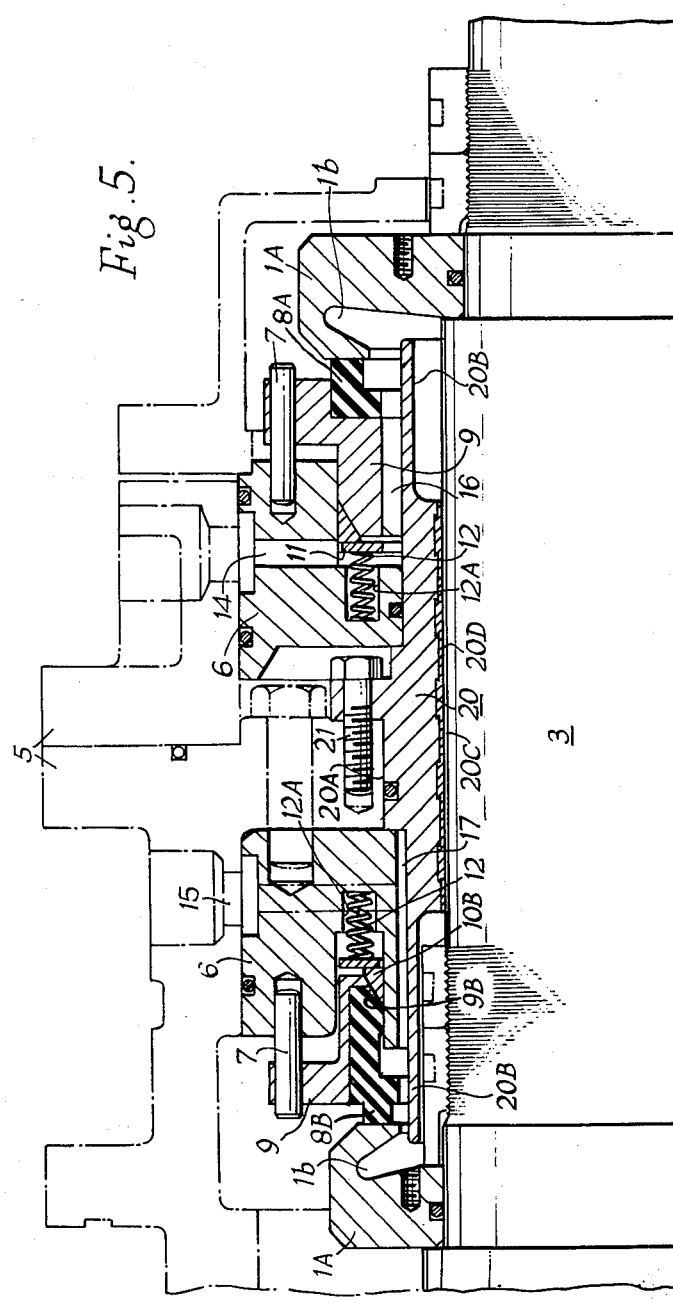

Some embodiments of the invention are illustrated, by way of example, in the accompanying drawings, wherein:

FIGURE 1 is a longitudinal sectional elevation of a seal having two paired sealing and seating rings with common liquid cooling means, FIGURES 2 and 3 are cross sections on lines II—II and III—III respectively of FIGURE 1, and FIGURES 4 and 5 are fragmentary longitudinal sectional elevations of two modified arrangements incorporating a roller bearing and a plain sleeve bearing respectively for the shaft.

In the particular construction illustrated in FIGURES 1 to 3, two seating ring carriers 1 carrying inwardly facing seating rings 2 are secured to a shaft 3 for rotation herewith, said carriers 1 being located at opposite ends of a spacing sleeve 4. The stationary rubbing face components of the seal are secured to a split pump casing 5 by clamping a flange 6C of a sealing ring carrier 6 in a recess 5A of said casing 5, said casing carrying location pegs 7 for holding sealing rings against rotation. The sealing ring carrier 6 is disposed intermediately of the seating ring carriers 1 and is formed with two protruding sleeve-like extensions 6A, 6B providing seating locations for the two outwardly facing sealing rings 8A, 8B which are positioned inside and outside the respective extensions 6A, 6B; rings 8A, 8B may be composed of carbon or of other materials customarily employed.

Two different forms of sealing rings are shown, one ring 8A being of rectangular cross section and mounted in an adaptor ring 9 having an outer cone face 9A, and the other sealing ring 8B having an inner cone face 9B, so that both cone faces 9A, 9B can be engaged by flexible wedge rings 10A, 10B respectively made of a deformable material; as an alternative, these wedge rings could be replaced by O-rings. The stationary sealing rings 8A, 8B are forced axially into facial rubbing contact with the rotating seating rings 2, through pressure rings 11 acting on the wedge rings by a series of compression springs 12 located in sockets 12A provided in carrier 6. It will be understood that the two sealing rings and associated components may be of similar or identical form and of either of the arrangements shown.

In the bore of the stationary sealing ring carrier 6 a coolant sleeve 13 is inserted and secured, for example, by being made a force-fit within said bore, the sleeve 13 serving as a guide for liquid coolant. Two radial holes 14, 15 are provided in the carrier 6, being positioned so as not to break into the sockets for springs 12 or for pegs 7, said holes 14, 15 communicating via ports 14A, 15A respectively with passages 16, 17 provided within the carrier extension 6B and within sealing ring adaptor 9.

When the shaft 3 is rotating, cooling liquid is introduced through hole 14, and thence flows along passage 16, around one end of sleeve 13, through the annulus 18 formed between sleeves 13 and 4, around the other end of sleeve 13, along passage 17 and out through port 15A into hole 15. In this way the coolant flows adjacent the rubbing faces of the seating rings 2 and the sealing rings 8A and 8B, and is constantly being changed; the seating ring carriers 1 are provided with annular recesses 1a in the vicinity of the face of carrier 1 with which a seating ring makes rubbing contact. The maximum amount of shaft area is embraced by spacing sleeve 4 which is exposed to the coolant for rapid dissipation of heat.

FIGURES 4 and 5 illustrate alternative seal constructions generally similar to that shown in FIGURES 1, 2 and 3, and where components in FIGURES 4 and 5 are equivalent in function, though possibly differing in shape, the same reference characters are employed for such components as used in FIGURES 1, 2 and 3. In view of the similarity between FIGURES 4 and 5 and FIGURE 1 only additional and modified components will be particularly referred to.

In the FIGURE 4 construction two co-axial spacing sleeves 4A are employed and are themselves spaced apart along shaft 3 by the inner running race 19A of an anti-friction bearing 19 of ball or, as shown, roller type, the outer fixed race 19B being secured within casing 5. The sealing ring carrier 6 and coolant sleeve 13 are duplicated, each carrier 6 (which is held against rotation by pegs 6a socketed in casing 5) and the coolant sleeve 13 carried thereby being associated with a sealing ring assembly; again two such seating ring assemblies are shown, of which one of each may be used or both assemblies may be of substantially similar or identical kind. Separate seating rings are dispensed with, a single metallic seating ring 1A serving the dual functions of the separate ring 2 and carrier 1 in FIGURE 1. The coolant inlet and outlet holes 14, 15 are shown as both located on the same side of the shaft 3; the coolant flows from one sealing assembly to another through the bearing 19.

The FIGURE 5 construction incorporates a plain sleeve bearing 20 for shaft 3, said bearing 20 comprising a central flanged cylindrical sleeve 20A, held against rotation by being secured by bolts 21 to the casing 5, and having axial end extensions 20B which serve as coolant sleeves. The central sleeve 20A has a keyed liner 20C of suitable anti-friction material, the bore of which has a plurality of longitudinal grooves 20D to allow coolant to flow from one sealing assembly to the other over the surface of shaft 3. Cooling of the seal faces is made more effective by forming of annular recesses 1b in the seating rings 1A. The ends of the axial extensions 20B are seen to enter the mouths of the annular recesses 1b which are formed concentric to and within the rubbing faces of the seating rings 1A. The recesses 1b narrow in width as they extend in radial direction to form undercut chambers behind the seating ring rubbing faces and it will be appreciated that some of the coolant flowing through holes 14 and 15, passages 16 and 17 and the sleeve bore grooves 20D will be flung centrifugally into the undercut chambers, so that the coolest liquid is held behind the seating ring rubbing faces.

In each of the seal constructions illustrated the coolant tends to form a liquid film between the seal faces, because the construction of the seal is such that the coolant can be pressurized and there is always a greater tendency for the film to be formed by centrifugal force from the bore rather than from the outer peripheries of the rubbing faces.

Moreover, in each of the illustrated constructions the coolant guiding sleeving is of appreciable length, that is, equal to not less than half the diameter of the encircled shaft. This ensures an adequate flow of liquid coolant over an appreciable length of said shaft to result in efficient cooling.

I claim:

1. A liquid-cooled face-type mechanical seal for use between a rotating shaft and a stationary housing, said seal comprising a seating ring around and connected to said shaft for rotation therewith, said seating ring having an inner rubbing face and an inwardly opening recess concentric to, within and adjacent said rubbing face, a sealing ring freely encircling said shaft and held against rotation by connection with said housing, said sealing ring having an outer rubbing face opposing said seating ring rubbing face, elastic means biasing said sealing and seating rings to maintain their rubbing faces in facial rubbing contact, sleeving encircling said shaft and defining therearound an annulus extending along the shaft and having one end opening out adjacent the rubbing faces of said sealing and seating rings opposite to said seating ring recess, and conduit means within said housing and surrounding said shaft for circulating a liquid coolant through said annulus and in the region of said ring rubbing faces, said conduit means comprising a carrier mounted within said housing for supporting said sleeving in spaced relation around said shaft, and projections on said carrier for holding said sealing ring against rotation while permitting endwise displacement of said sealing ring, said carrier having passageways for circulating said liquid coolant so as to flow over and through said sleeving and around the ring rubbing faces.

2. A seal as claimed in claim 1, wherein said sleeving is interrupted by a shaft bearing through which coolant flows.

3. A seal as claimed in claim 2, wherein said sleeving includes a plain tubular bearing having a through bore and provided with grooves in its bore through which coolant flows.

4. A seal as claimed in claim 1, characterised by the provision of an adaptor ring for supporting a sealing ring, said adaptor ring having a coned face for engagement with a wedge ring onto which spring pressure is applied through a backing ring.

5. A seal as claimed in claim 1, wherein the carrier has a cylindrical extension constituting an interior support for a sealing ring, a sealing ring adaptor having a coned seating and a wedge ring having a coned seating complementary to said adaptor seating.

6. A seal as claimed in claim 1, wherein the carrier has a cylindrical extension constituting an external support for a sealing ring.

7. A liquid-cooled face-type mechanical seal between a rotating shaft and a surrounding stationary housing, said seal comprising a pair of seating rings mounted in longitudinal spaced relation along the shaft for rotation therewith, each seating ring having an inner rubbing face and an inwardly opening recess concentric to, within and adjacent said rubbing face, a disc-like centrally apertured carrier mounted in the housing and surrounding said shaft intermediately of said seating rings, a pair of sealing rings disposed on opposite sides of said carrier, each of said sealing rings having an outer rubbing face opposing the rubbing face of the corresponding seating ring, spring means acting on said sealing rings to bias their rubbing faces into facial rubbing contact with said rubbing faces of the respective seating rings, projections within said housing co-acting with said sealing rings to hold them against rotation, and an open-end sleeve supported in said carrier aperture so as to support said shaft and to dispose its opposite open ends concentrically within said seating ring recesses and thus adjacent the rubbing faces of the paired sealing and seating rings, said carrier having inlet and outlet passageways for a liquid coolant, porting communicating with said inlet passageway to deliver coolant for flowing over one half of said sleeve exterior and around one end thereof, and into one seating ring recess, through said sleeve and around the other end thereof and into the other seating ring recess and for flowing over the other half of said sleeve exterior, and a port comunnicating with said outlet passageway.

8. A seal as claimed in claim 7, wherein each seating ring recess is shaped to extend behind the rubbing face of said ring.

9. A liquid-cooled face-type mechanical seal between a rotating shaft and a surrounding stationary housing, said seal comprising a bearing sleeve surrounding and supporting said shaft and being secured to said stationary housing, the bore of said sleeve having longitudinal grooving therein, two sealing ring carriers each encircling one end portion of said bearing sleeve and both secured in fixed relation to said stationary housing, two sealing ring adaptors encircling opposite ends of said sleeve to leave passageways around said sleeve ends, each adaptor being slidable in one of said carriers, means restraining said adaptors against rotation relative to said fixed carriers, two sealing rings each carried by one of said adaptors and both having outwardly directed rubbing faces, two seating rings fixedly secured in longitudinal spaced relation along said shaft and each having an inwardly directed rubbing face opposing a corresponding sealing ring rubbing face, each of said seating rings having a recess concentric to and within the seating ring rubbing face, and each of said seating ring recesses receiving one of the opposite open ends of said sleeve and narrowing in width and in radial direction to extend behind the rubbing face of the seating ring, and spring means interposed between said carriers and said adaptors to bias the latter to maintain the sealing ring rubbing faces in facial rubbing contact with said seating ring rubbing faces, said carriers being formed with radial passages connecting with said passageways between said sleeve and said adaptors and the sealing rings carried thereby to provide for circulation of liquid coolant through said carrier passages, said passageways and the longitudinally grooved bore of said sleeve, said narrowing seating ring recesses holding centrifugally flung coolant behind the rubbing faces for their effective cooling.

10. A liquid-cooled face-type mechanical seal for sealing between a rotating shaft and a stationary housing encircling said shaft, said seal comprising at least one seating ring around and connected to said shaft for rotation therewith, said seating ring having an inner rubbing face and an inwardly opening recess concentric to, within and adjacent said rubbing face, at least one sealing ring opposed to said one seating ring, freely encircling said shaft and held against rotation by connection with said housing, said sealing ring having an outer rubbing face contacting said seating ring rubbing face, elastic biasing means maintaining said sealing ring and seating ring rubbing faces in facial rubbing contact, and sleeving encircling said shaft and defining therearound an annulus extending around and along said shaft for a length equal to not less than half the diameter of said shaft and having an end thereof opening out adjacent said seating ring recess, said sleeving incorporating a tubular bearing having a bore for supporting said shaft, said bearing bore having longitudinal surface channels therein, and said sleeving annulus extending beyond said bearing on at least that side thereof whereat is situated at least one seating ring and the co-operating sealing ring, said annulus and said bearing bore channels together serving to guide liquid coolant through said annulus and channels and into the recess in the region of the rubbing faces of said cooperating seating and sealing rings.

References Cited in the file of this patent
UNITED STATES PATENTS

| | | |
|---|---|---|
| 2,299,119 | Yeomans | Oct. 20, 1942 |
| 2,555,492 | Kidney | July 5, 1951 |
| 2,723,868 | Hartranft | Nov. 15, 1955 |
| 2,801,117 | Bourgeois | July 30, 1957 |
| 2,820,653 | Yokel | Jan. 21, 1958 |
| 2,836,440 | Brumagin | May 27, 1958 |
| 2,886,349 | Porges | May 12, 1959 |
| 2,928,685 | Tracy | Mar. 15, 1960 |
| 2,992,842 | Shevchenko et al. | July 18, 1961 |